United States Patent
Murawski et al.

(10) Patent No.: US 12,025,275 B2
(45) Date of Patent: Jul. 2, 2024

(54) MONOLITHIC PRESSURE REGULATOR

(71) Applicant: Goodrich Corporation, Charlotte, NC (US)

(72) Inventors: Tomasz Murawski, Trzebnica (PL); Tomasz Wanski, Chrzastawa Wielka (PL)

(73) Assignee: GOODRICH CORPORATION, Charlotte, NC (US)

(*) Notice: Subject to any disclaimer, the term of this patent is extended or adjusted under 35 U.S.C. 154(b) by 0 days.

(21) Appl. No.: 18/296,321

(22) Filed: Apr. 5, 2023

(65) Prior Publication Data

US 2023/0243473 A1 Aug. 3, 2023

Related U.S. Application Data

(62) Division of application No. 17/100,365, filed on Nov. 20, 2020, which is a division of application No. 16/280,647, filed on Feb. 20, 2019, now Pat. No. 10,871,260.

(51) Int. Cl.
*F17C 13/04* (2006.01)
*B63C 9/18* (2006.01)
*B64D 25/14* (2006.01)

(52) U.S. Cl.
CPC .............. *F17C 13/04* (2013.01); *B64D 25/14* (2013.01); *B63C 9/18* (2013.01); *F17C 2205/0338* (2013.01); *Y10T 137/7839* (2015.04)

(58) Field of Classification Search
CPC ......... Y10T 137/7781; Y10T 137/7235; Y10T 137/7836
See application file for complete search history.

(56) References Cited

U.S. PATENT DOCUMENTS

| | | |
|---|---|---|
| 3,744,751 A | 7/1973 | Robinson |
| 4,299,250 A | 11/1981 | Happe |
| 4,335,742 A | 6/1982 | Jacyno |
| 4,698,060 A | 10/1987 | Antonio |
| 4,735,232 A | 4/1988 | Apostoly et al. |
| 5,179,982 A | 1/1993 | Berube |
| 6,050,292 A | 4/2000 | Richman et al. |
| 8,356,693 B2 | 1/2013 | Franconi |
| 10,393,301 B1 | 8/2019 | Danielson |
| 2004/0195457 A1 | 10/2004 | Baker et al. |
| 2014/0000730 A1 | 1/2014 | Nguyen et al. |
| 2015/0040990 A1 | 2/2015 | Mathiesen et al. |

(Continued)

OTHER PUBLICATIONS

USPTO, Non Final Office Action dated Apr. 1, 2020 in U.S. Appl. No. 16/280,647.

(Continued)

*Primary Examiner* — Robert K Arundale
(74) *Attorney, Agent, or Firm* — SNELL & WILMER L.L.P.

(57) ABSTRACT

A monolithic pressure regulator may comprise a body comprising a base wall, an end wall, and a side wall, a cavity within the body, an input port in fluid communication with the cavity, an output port in fluid communication with the cavity, a first vesicle configured to regulate a flow of fluid through the input port into the cavity at a source pressure to exit through the output port at a regulated pressure, wherein the first vesicle comprises a first vesicle wall contiguous with a bulkhead and at least one of the base wall or the end wall.

9 Claims, 8 Drawing Sheets

(56) References Cited

U.S. PATENT DOCUMENTS

2019/0233173 A1    8/2019   Haynes et al.

OTHER PUBLICATIONS

USPTO, Notice of Allowance dated Aug. 20, 2020 in U.S. Appl. No. 16/280,647.
USPTO; Requirement for Restriction dated Jul. 14, 2021 in U.S. Appl. No. 17/100,365.
USPTO; Non Final Office Action dated Nov. 30, 2021 in U.S. Appl. No. 17/100,365.
USPTO; Final Office Action dated May 11, 2022 in U.S. Appl. No. 17/100,365.
"Monolithic", Merriam-Webster, printer Mar. 30, 2022.
USPTO; Advisory Action dated Jun. 7, 2022 in U.S. Appl. No. 17/100,365.
USPTO; Non Final Office Action dated Sep. 1, 2022 in U.S. Appl. No. 17/100,365.
USPTO; Notice of Allowance dated Jan. 10, 2023 in U.S. Appl. No. 17/100,365.

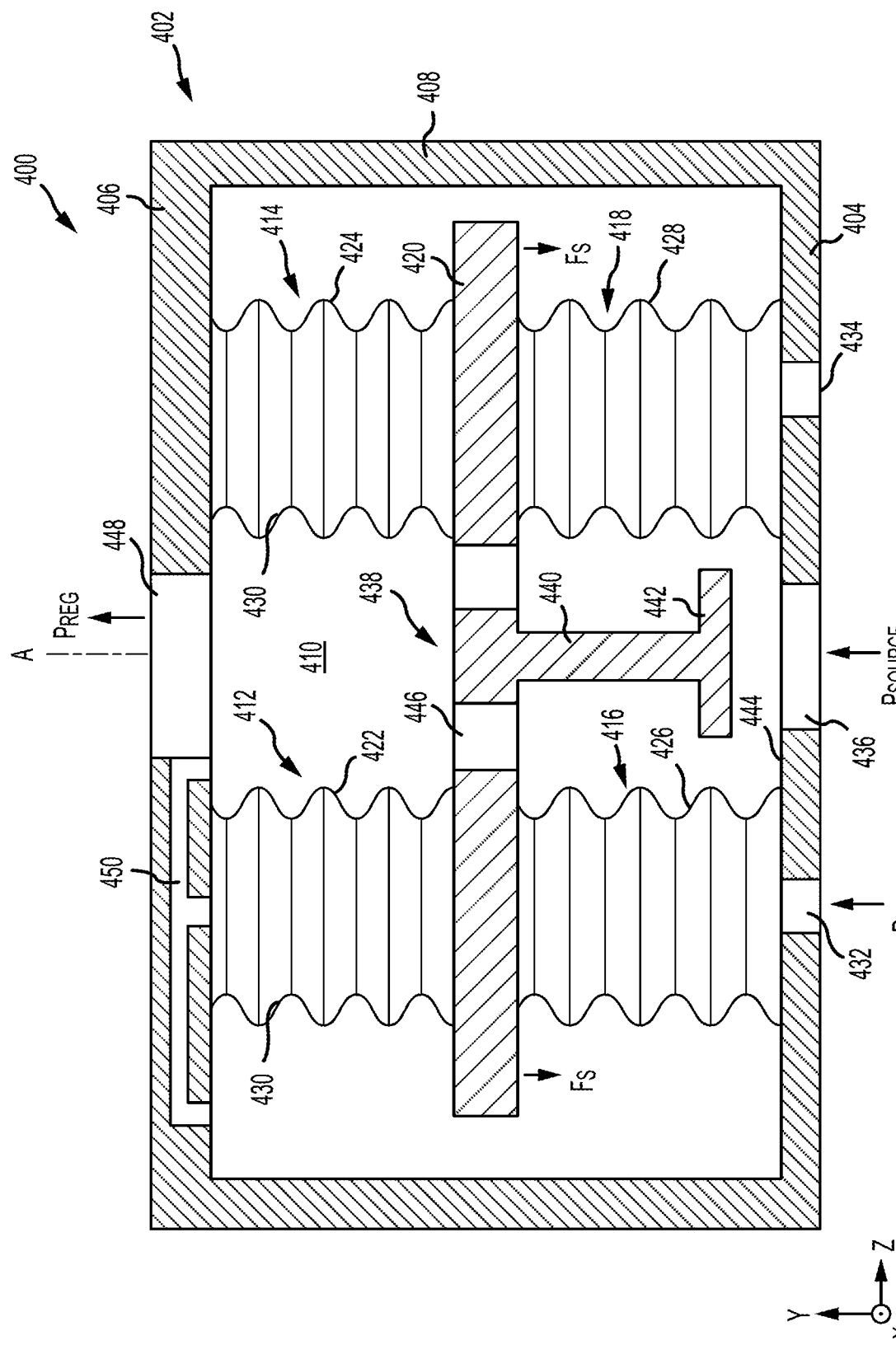

MONOLITHIC PRESSURE REGULATOR

CROSS REFERENCE TO RELATED APPLICATIONS

This application is a divisional of, and claims priority to, and the benefit of U.S. patent application Ser. No. 17/100,365, filed on Nov. 20, 2020, and entitled "MONOLITHIC PRESSURE REGULATOR." The '365 application is a divisional of, and claims priority to, and the benefit of U.S. patent application Ser. No. 16/280,647, filed on Feb. 20, 2019, and entitled "MONOLITHIC PRESSURE REGULATOR," which issued on Dec. 22, 2020 as U.S. Pat. No. 10,871,260. Both of which are incorporated by reference herein in their entireties for all purposes.

FIELD

The present disclosure is directed to evacuation systems for use in aircraft and, more particularly, to pressure regulators for inflating evacuation devices.

BACKGROUND

In the event of an aircraft evacuation, evacuation assemblies, such as evacuation slides, are often deployed to safely usher passengers from the aircraft to the ground. Emergency evacuation slides may be used to exit an aircraft absent a jet way or other means of egress for passengers. Inflatable evacuation devices, such as aircraft evacuation slides and emergency life rafts, typically include a compressed fluid source (such as a charged gas cylinder) and a pressure regulator. The pressure regulator, working with the compressed fluid source, may reduce fluid pressure from the source pressure to an intermediate pressure for inflating the emergency evacuation devices. Pressure regulators typically comprise multiple seals and moving subassemblies lending to multiple failure points which tend to be undesirable for emergency evacuation systems. Pressure regulators are typically stored in a limited packing space with the evacuation slide within a small space in the aircraft. The high packing density may lead to various issues including damage to the regulator, which may be fragile. It is therefore desirable to minimize the regulator envelope and regulator part count.

SUMMARY

A monolithic pressure regulator for an inflatable device is described herein, in accordance with various embodiments. An monolithic pressure regulator may comprise a body comprising a base wall, an end wall, and a side wall, a cavity within the body, an input port in fluid communication with the cavity, an output port in fluid communication with the cavity, a first vesicle configured to regulate a flow of fluid through the input port into the cavity at a source pressure to exit through the output port at a regulated pressure, wherein the first vesicle comprises a first vesicle wall contiguous with a bulkhead and at least one of the base wall or the end wall.

In various embodiments, the first vesicle comprises one of a sinusoidal vesicle wall, a triangular vesicle wall, a trapezoidal vesicle wall, a sine-dwell vesicle wall, a rectangular vesicle wall, or an elliptical vesicle wall. In various embodiments, the first vesicle is disposed outward of the end wall and the first vesicle wall extends from an outer surface of the end wall into the bulkhead. In various embodiments, a valve stem extends inward from the bulkhead through the first vesicle and through a valve guide at the end wall into the cavity. In various embodiments, the regulator further comprises a second vesicle wherein the first vesicle, the second vesicle, and the bulkhead are disposed within the cavity, wherein bulkhead fluidly isolates the first vesicle and the second vesicle, wherein the second vesicle is in fluid communication with a sense port through the base wall. In various embodiments, the bulkhead comprises a leg extending from the perimeter of the bulkhead, wherein a distal end of the leg comprises a foot having a sealing face oriented toward the input port. In various embodiments, the bulkhead comprises a portion having an opening through the bulkhead and a valve stem extending toward the input port.

An evacuation system for use with an aircraft is also provided. The evacuation system may comprise an inflatable evacuation device configured to be inflated by a compressed fluid source. A monolithic pressure regulator may be coupled to the compressed fluid source and to the inflatable evacuation device. The monolithic pressure regulator may comprise a body comprising a base wall, an end wall, and a side wall, a cavity within the body, an input port in fluid communication with the cavity and the compressed fluid source, an output port in fluid communication with the cavity and the inflatable evacuation device, a first vesicle configured to regulate a flow of fluid through the input port into the cavity at a source pressure to exit through the output port at a regulated pressure, wherein the first vesicle comprises a first vesicle wall contiguous with a bulkhead and at least one of the base wall or the end wall.

In various embodiments, the first vesicle comprises one of a sinusoidal vesicle wall, a triangular vesicle wall, a trapezoidal vesicle wall, a sine-dwell vesicle wall, a rectangular vesicle wall, or an elliptical vesicle wall. In various embodiments, the first vesicle is disposed outward of the end wall and the first vesicle wall extends from an outer surface of the end wall into the bulkhead. In various embodiments, a valve stem extends inward from the bulkhead through the first vesicle and through a valve guide at the end wall into the cavity. In various embodiments, the regulator further comprises a second vesicle wherein the first vesicle, the second vesicle, and the bulkhead are disposed within the cavity, wherein bulkhead fluidly isolates the first vesicle and the second vesicle, wherein the second vesicle is in fluid communication with a sense port through the base wall. In various embodiments, the bulkhead comprises a leg extending from the perimeter of the bulkhead, wherein a distal end of the leg comprises a foot having a sealing face oriented toward the input port. In various embodiments, the bulkhead comprises a portion having an opening through the bulkhead and a valve stem extending toward the input port.

An article of manufacture is also provided. The article of manufacture includes a body comprising a base wall, an end wall, and a side wall, a cavity within the body, an input port in fluid communication with the cavity, an output port in fluid communication with the cavity, a first vesicle configured to regulate a flow of fluid through the input port into the cavity at a source pressure to exit through the output port at a regulated pressure, wherein the first vesicle comprises a first vesicle wall contiguous with a bulkhead and at least one of the base wall or the end wall.

In various embodiments, the first vesicle is disposed outward of the end wall and the first vesicle wall extends from an outer surface of the end wall into the bulkhead. In various embodiments, a valve stem extends inward from the bulkhead through the first vesicle and through a valve guide at the end wall into the cavity. In various embodiments, the regulator further comprises a second vesicle wherein the first vesicle, the second vesicle, and the bulkhead are disposed within the cavity, wherein bulkhead fluidly isolates the first vesicle and the second vesicle, wherein the second vesicle is in fluid communication with a sense port through the base wall. In various embodiments, the bulkhead comprises a leg extending from the perimeter of the bulkhead, wherein a distal end of the leg comprises a foot having a sealing face oriented toward the input port. In various embodiments, the bulkhead comprises a portion having an opening through the bulkhead and a valve stem extending toward the input port.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

FIG. 4 illustrates a cross section of a monolithic regulator, in accordance with various embodiments;

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact. Cross hatching lines may be used throughout the figures to denote different parts but not necessarily to denote the same or different materials.

The present disclosure relates to monolithic pressure regulator for inflatable devices. In various embodiments, the monolithic pressure regulator may include a monolithic structure comprising one or more vesicles contiguous with a wall surface. The monolithic structure may enable the monolithic pressure regulator to be made having fewer parts and tending thereby to be more compact. A compact size tends to allow the monolithic pressure regulator to occupy less storage space within the packboard of the aircraft. Additionally, by reducing parts count the monolithic pressure regulator tends to benefit of an increase in reliability and ease of manufacture.

Figure 1A:
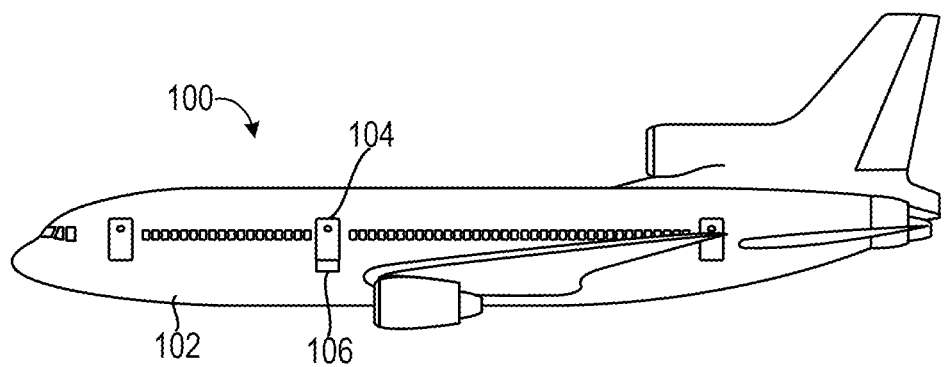
FIG. 1A illustrates a perspective view of an aircraft having an evacuation system, in accordance with various embodiments.

Referring to FIG. 1A, an aircraft 100 is shown, in accordance with various embodiments. Aircraft 100 may include a fuselage 102 having plurality of exit doors including exit door 104. Aircraft 100 may include one or more evacuation systems positioned near a corresponding exit door. For example, aircraft 100 includes an evacuation system 106 positioned near exit door 104. Evacuation system 106 may be removably coupled to fuselage 102. In the event of an emergency, exit door 104 may be opened by a passenger or crew member of the aircraft 100. In various embodiments, evacuation system 106 may deploy in response to the exit door 104 being opened and, in various embodiments, evacuation system 106 may deploy in response to another action taken by a passenger or crew member such as depression of a button or actuation of a lever.

Figure 1B:
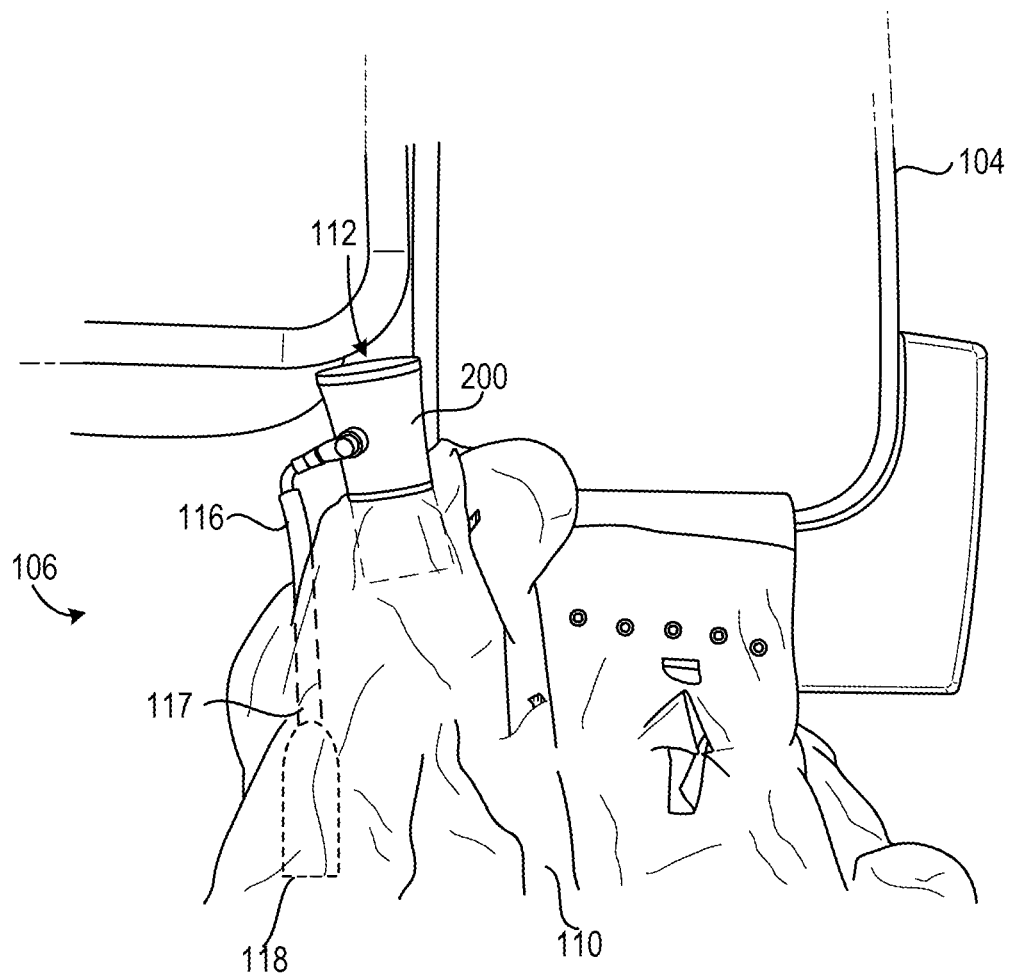
FIG. 1B illustrates an evacuation system of an aircraft, in accordance with various embodiments.

Referring to FIGS. 1A and 1B, additional details of evacuation system 106 are illustrated, in accordance with various embodiments. In particular, evacuation system 106 includes an inflatable evacuation device 110. Inflatable evacuation device 110 may be a slide, a slide raft, a life raft, a floatation device or other evacuation device, which may be inflatable. Evacuation system 106 further includes a source of pressure regulated fluid 112. The pressure regulated fluid 112 may enter the inflatable evacuation device 110 to inflate the inflatable evacuation device 110. The inflatable evacuation device 110 may be coupled to the fuselage 102 of FIG. 1, and may be decoupled from fuselage 102 in response to being fully inflated or manually detached to allow passengers and/or crew members to safely float away from aircraft 100 of FIG. 1.

In various embodiments, the source of pressure regulated fluid 112 may include monolithic pressure regulator 200 coupled to the inflatable evacuation device 110, piping 116 coupled to the monolithic pressure regulator 200, and a compressed fluid source 118 coupled to the piping 116. In various embodiments the monolithic pressure regulator 200 may be coupled directly to the compressed fluid source 118 or may be integral to the compressed fluid source 118. During normal flight conditions, inflatable evacuation device 110 may be deflated and stored within a compartment of aircraft 100. In various embodiments, inflatable evacuation device 110 and monolithic pressure regulator 200 may be stored in a single package within the aircraft compartment. In response to deployment of evacuation system 106, a valve 117 may open and fluid may flow from compressed fluid source 118 into monolithic pressure regulator 200 via piping 116 at a relatively high pressure, i.e. the source pressure ($P_{source}$). This fluid flow may cause monolithic pressure regulator 200 to reduce the relatively high pressure fluid to a relatively lower pressure, i.e. a regulated pressure ($P_{reg}$). The fluid flow (such as in a gaseous state) may be directed into the inflatable evacuation device 110 at the relatively lower pressure. In response to receiving the fluid flow, inflatable evacuation device 110 may begin to inflate.

Figure 2A:
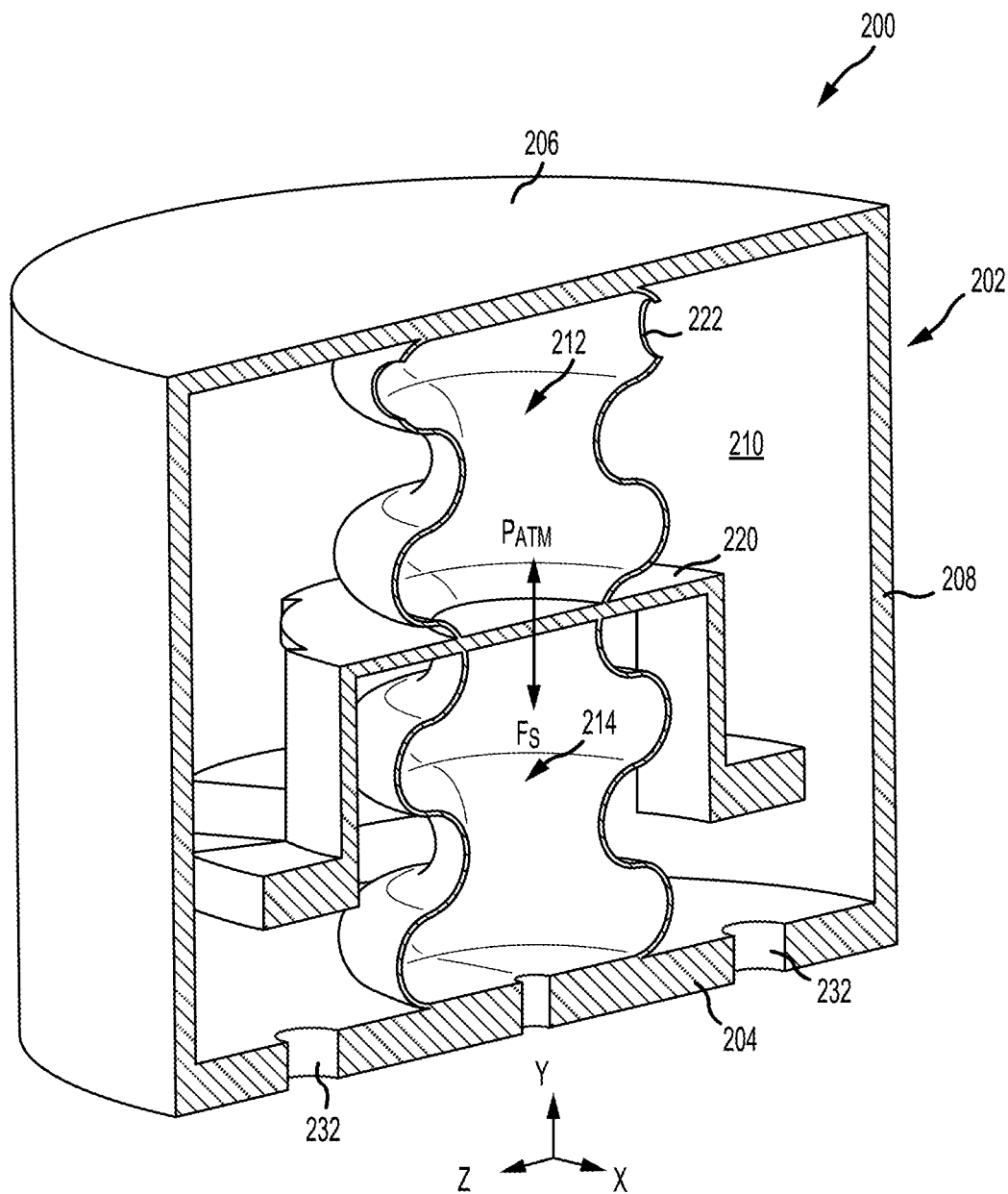
FIG. 2A illustrates a perspective cross section of a monolithic regulator for an inflatable evacuation device, in accordance with various embodiments.
Figure 2B:
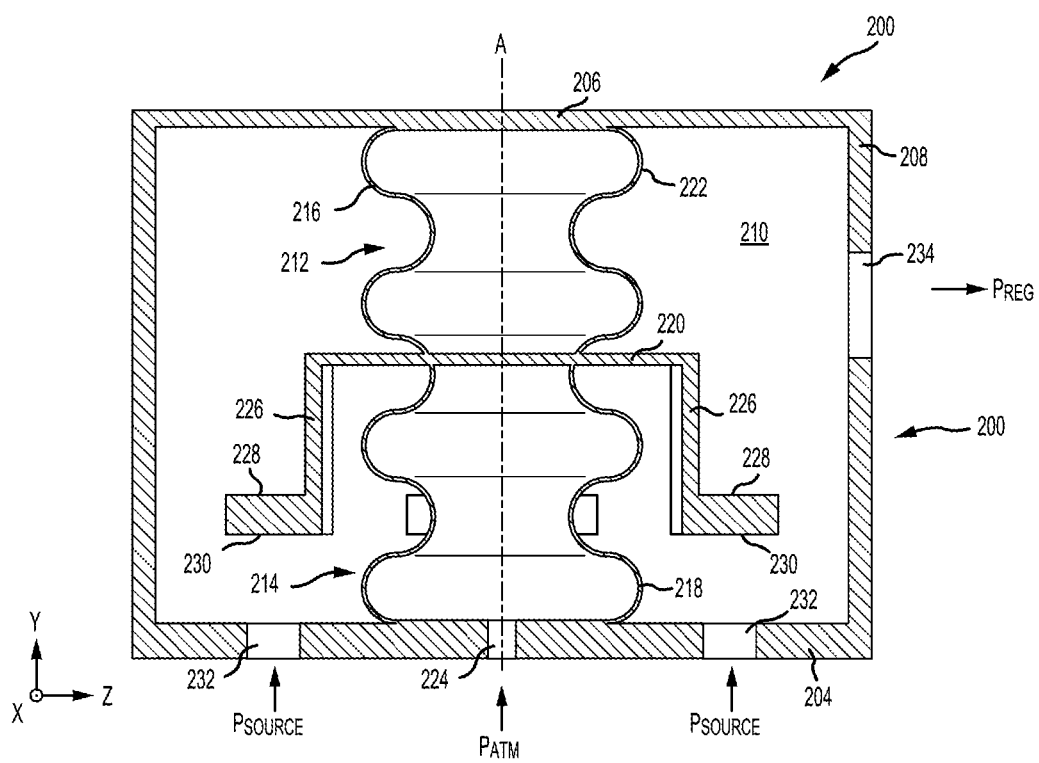
FIG. 2B illustrates a cross section of a monolithic regulator for an inflatable evacuation device, in accordance with various embodiments.

With reference to FIGS. 2A and 2B, additional details of monolithic pressure regulator 200 are shown with XYZ-axes provided for reference, in accordance with various embodiments. FIG. 2A illustrates monolithic pressure regulator 200 in perspective cross section through the YZ-plane and FIG. 2B illustrates monolithic pressure regulator 200 in cross section through the YZ-plane with the plane of cross section parallel to the page. Monolithic pressure regulator 200 comprises a body 202 having a base wall 204 opposite (along the Y-axis) an end wall 206. Base wall 204 and end wall 206 are joined by side wall 208. In various embodiments, body 202 may comprise a hollow cylindrical structure extending along a center axis A (parallel the Y-axis). The hollow cylindrical structure defines a cavity 210 within the body 202. A monolithic pressure regulator, such as monolithic pressure regular 200, may be additively manufactured and comprise a monolithic structure of a homogeneous material.

In various embodiments, a first vesicle 212 and a second vesicle 214 are disposed within the cavity 210 of body 202. The first vesicle 212 is positioned relatively above (on the Y-axis) the second vesicle 214. First vesicle wall 216 extends from and is contiguous with end wall 206 and second vesicle wall 218 extends from and is contiguous with base wall 204. The first vesicle wall 216 may comprise one or more perforations 222 such that the first vesicle 212 is in fluid communication with the cavity 210. The first vesicle 212 and the second vesicle 214 are divided internally by a bulkhead 220 which fluidly isolates the first vesicle 212 from the second vesicle 214. The second vesicle 214 is in fluid communication with sense port 224. Sense port 224 opens through the base wall 204 enabling the second vesicle 214 to receive a fluid at a sensing pressure, for example, an atmospheric pressure ($P_{atm}$).

In various embodiments, bulkhead 220 is contiguous with and extends through vesicle walls (216, 218) into the cavity 210 of body 202. One or more legs 226 may be coupled symmetrically about the perimeter of the bulkhead 220. Each of the legs 226 extend relatively below (along the Y-axis) the bulkhead toward a distal end proximate the base wall 204. Each of the legs 226 comprise a foot 228 at the distal end of the legs 226 having a sealing face 230 oriented relatively toward a corresponding input port 232. Each of the input ports 232 open through the base wall 204 and may be in fluid communication with compressed fluid source 118. In this regard, input ports 232 tend to enable the cavity 210 to receive fluid from compressed fluid source 118 at $P_{source}$.

In various embodiments, the first vesicle wall 216 and the second vesicle wall 218 may be configured to exert a spring force Fs on bulkhead 220. The spring force Fs may tend to drive the bulkhead 220 relatively toward the base wall 204 and, in response, dispose feet 228 proximate base wall 204 and contacting sealing faces 230 of feet 228 with input ports 232. In this regard, feet 228 may seal input ports 232 tending thereby to inhibit fluid communication via input ports 232 with the cavity 210. In various embodiments, the spring force Fs may be partially balanced by the atmospheric pressure $P_{atm}$. In response to receiving high pressure fluid from compressed fluid source 118, the $P_{source}$ pressure may tend to overcome the spring force Fs thereby tending to drive feet 228 relatively upward (along the Y-axis) disposing the sealing faces 230 relatively away from input ports 232 and enabling fluid communication with the cavity 210. In response to the motion of feet 228, bulkhead 220 may be driven relatively upward tending to compress first vesicle wall 216 and elongate second vesicle wall 218. In various embodiments, the upward motion of bulkhead 220 may tend to increase the spring force Fs in proportion to the elongation and compression of the respective vesicle walls (216, 218) and thereby tend to restrict the flow of fluid through input ports 232 into cavity 210. In this regard, the vesicles (212, 214) may tend to regulate the flow of fluid into cavity 210 at $P_{source}$ to exit via output port 234 through side wall 208 at the regulated pressure $P_{reg}$.

Figure 3A:
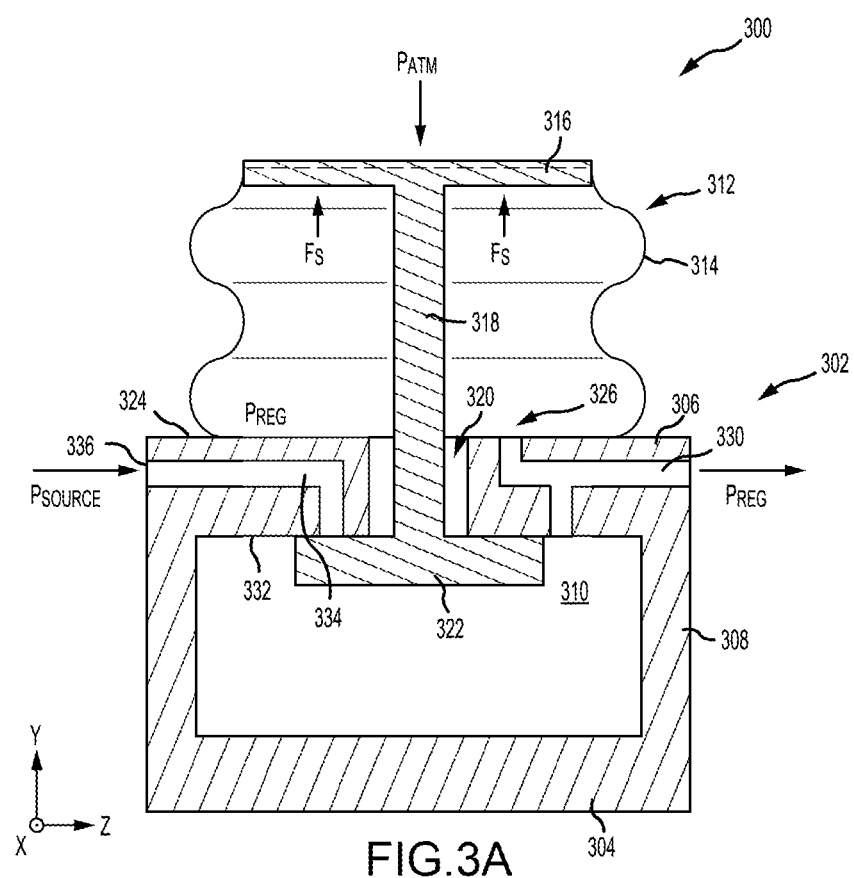
FIG. 3A illustrates a cross section of a monolithic regulator in the closed position, in accordance with various embodiments.
Figure 3B:
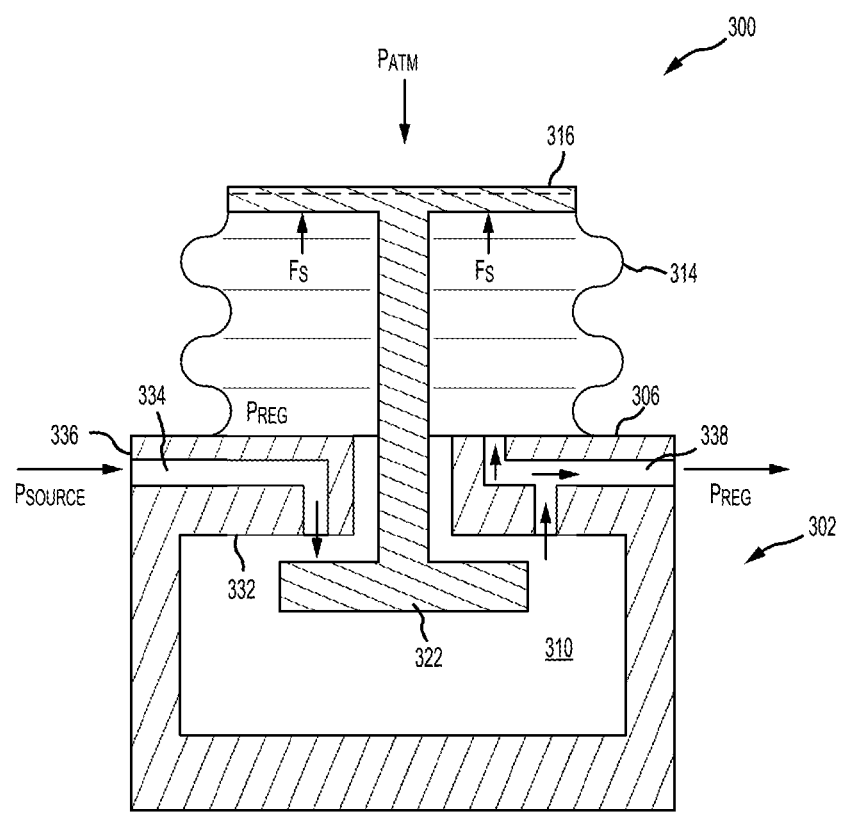
FIG. 3B illustrates a cross section of a monolithic regulator in the open position, in accordance with various embodiments.

In various embodiments and with reference to FIGS. 3A and 3B, a monolithic pressure regulator 300 is illustrated having features, geometries, construction, materials, manufacturing techniques, and/or internal components similar to monolithic pressure regulator 200. FIG. 3A illustrates monolithic pressure regulator 300 in the closed position and FIG. 3B illustrates monolithic pressure regulator 300 in the open position. Monolithic pressure regulator 300 comprises a body 302 having a base wall 304 opposite (along the Y-axis) an end wall 306. Base wall 304 and end wall 306 are joined by side wall 308. In various embodiments, body 202 may comprise a hollow structure extending parallel the Y-axis. The hollow structure defines a cavity 310 within the body 302.

In various embodiments, a vesicle 312 is disposed outward (along the Y-axis) of the end wall 306. The walls 314 of vesicle 312 are contiguous with the end wall 306 and extend from the outer surface 324 of the end wall 306 into bulkhead 316. Vesicle 312 is sealed by bulkhead 316 and in fluid communication with the cavity 310 via sense port 326 and output passage 330 disposed within the end wall 306. A valve stem 318 extends inward (along the Y-axis) from the bulkhead 316 through valve guide 320. A valve head 322 is coupled at a distal end of the valve stem 318 from bulkhead 316 and seats against an inner surface 332 of end wall 306. The valve head 322 is integral to the valve stem 318 and bulkhead 316. In various embodiments, wall 314 of vesicle 312 may be configured to exert a spring force Fs on bulkhead 316. The spring force Fs may tend to drive the bulkhead 316 relatively away from the end wall 306 and, in response, hold valve head 322 seated against inner surface 332. In this regard, valve head 322 may obstruct and/or seal an input passage 334 disposed within end wall 306 tending thereby to inhibit fluid communication between input port 336 and the cavity 310. In various embodiments, the spring force Fs may be partially balanced by the atmospheric pressure $P_{atm}$ acting at the bulkhead 316.

As illustrated in FIG. 3B and in response to receiving high pressure fluid from compressed fluid source 118 at input port 336, the $P_{source}$ pressure may tend to overcome the spring force Fs thereby tending to drive valve head 322 relatively downward (along the Y-axis) into cavity 310. In reaction to the $P_{source}$ pressure, the valve head 322 is disposed relatively away from inner surface 332 thereby enabling fluid communication between the cavity 210 and the input port 336. In response to the motion of valve head 322, bulkhead 316 may be driven relatively inward toward end wall 306 tending to compress vesicle wall 314. In various embodiments, the inward motion of bulkhead 316 may tend to increase the spring force Fs in proportion to the compression of the vesicle wall 314 and thereby tend to restrict the flow of fluid through input passage 334 into cavity 310. In this regard, the vesicle 312 may tend to regulate the flow of fluid into cavity 310 at $P_{source}$ to exit through output passage 330 via output port 338 at the regulated pressure $P_{reg}$.

In various embodiments and with reference to FIG. 4, a monolithic pressure regulator 400 is illustrated having features, geometries, construction, materials, manufacturing techniques, and/or internal components similar to monolithic pressure regulator 200. Monolithic pressure regulator 400 comprises a body 402 having a base wall 404 opposite (along the Y-axis) an end wall 406. Base wall 404 and end wall 406 are joined by side wall 408. In various embodiments, body 402 may comprise a hollow structure extending along a center axis A (parallel the Y-axis). The hollow structure defines a cavity 310 within the body 302.

In various embodiments, a first vesicle 412, a second vesicle 414, a third vesicle 416, and a fourth vesicle 418 are disposed within the cavity 410 of body 402. The first vesicle 412 and the second vesicle 414 extend between the end wall 406 and a common bulkhead 420. The first vesicle wall 422 and the second vesicle wall 424 are contiguous with the end wall 406 and the bulkhead 420. The third vesicle 416 and the fourth vesicle 418 extend between the common bulkhead 420 and the base wall 404. The third vesicle wall 426 and the fourth vesicle wall 428 are contiguous with the common bulkhead 420 and the base wall 404. In various embodiments, the first vesicle 412 is coaxial with the third vesicle 416 and the second vesicle 414 is coaxial with the fourth vesicle 418. In various embodiments, the first vesicle wall 422 and the second vesicle wall 424 may comprise one or more perforations 430 such that the first vesicle 412 and the second vesicle 414 are in fluid communication with the cavity 410. In various embodiments, end wall 406 may comprise internal passages 450 in fluid communication between the cavity 410, the first vesicle 412, and/or the second vesicle 414. The first vesicle 412 and third vesicle 416 are divided internally by the common bulkhead 420 which fluidly isolates the first vesicle 412 from the third vesicle 416. The second vesicle 414 and the fourth vesicle 418 are similarly divided and fluidly isolated by the common bulkhead 420.

In various embodiments, the third vesicle 416 is in fluid communication with a first sense port 432 and the fourth vesicle 418 is in fluid communication with a second sense port 434. Each of the sense ports (432, 434) open through the base wall 404 enabling the respective vesicle to receive the fluid at the sensing pressure $P_{atm}$. Cavity 410 is in fluid communication with an input port 436 opening through the base wall 404. Input port 436 may be centered on the axis A and may be in fluid communication with the compressed fluid source 118. In this regard, input port 436 tends to enable the cavity 410 to receive fluid from the compressed fluid source 118 at $P_{source}$. Common bulkhead 420 divides the vesicles along the XZ-plane and has a portion 438 which extends relatively between the vesicle walls (e.g., between first vesicle wall 422 and second vesicle wall 424. The portion 438 of common bulkhead 420 may comprise one or more openings 446. A valve stem 440 may extend beneath (along the Y-axis) the portion 438 of the common bulkhead 420 toward the input port 436. A valve head 442 is coupled at a distal end of the valve stem 440 from the common bulkhead 420 and seats against an inner surface 444 of the base wall 404. The valve head 442 is integral to the valve stem 440 and common bulkhead 420.

In various embodiments, the first vesicle wall 422, the second vesicle wall 424, the third vesicle wall 426, and the fourth vesicle wall 428 may be configured to exert a spring force Fs on common bulkhead 420. The spring force Fs may tend to drive the bulkhead 220 relatively toward the base wall 404 and, in response, hold valve head 442 seated against inner surface 444 of base wall 404. In this regard, valve head 442 may obstruct and/or seal input port 436 tending thereby to inhibit fluid communication between the input port 436 and the cavity 410. In various embodiments, the spring force Fs may be partially balanced by the atmospheric pressure $P_{atm}$. In response to receiving high pressure fluid from compressed fluid source 118 at input port 436, the $P_{source}$ pressure may tend to overcome the spring force Fs thereby tending to drive valve head 442 relatively upward (along the Y-axis) away from the inner surface 444 thereby enabling fluid communication between the cavity 410 and the input port 436.

The motion of valve head 442 may be transferred via valve stem 440 to common bulkhead 420. In response, common bulkhead 420 may be driven relatively upward (along the Y-axis) tending to compress the first vesicle wall 422 and the second vesicle wall 424 and tending to elongate the third vesicle wall 426 and the fourth vesicle wall 428. In various embodiments, the upward motion of common bulkhead 420 may tend to increase the spring force Fs in proportion to the elongation and compression of the respective vesicle walls (422, 424, 426, 428) and thereby tend to restrict the flow of fluid through input port 436 into cavity 410. In this regard, the vesicles (412, 412, 416, 418) may tend to regulate the flow of fluid into cavity 410 which may exit via output port 448 through end wall 406 at the regulated pressure $P_{reg}$.

Figures 5A, 5B, 5C:
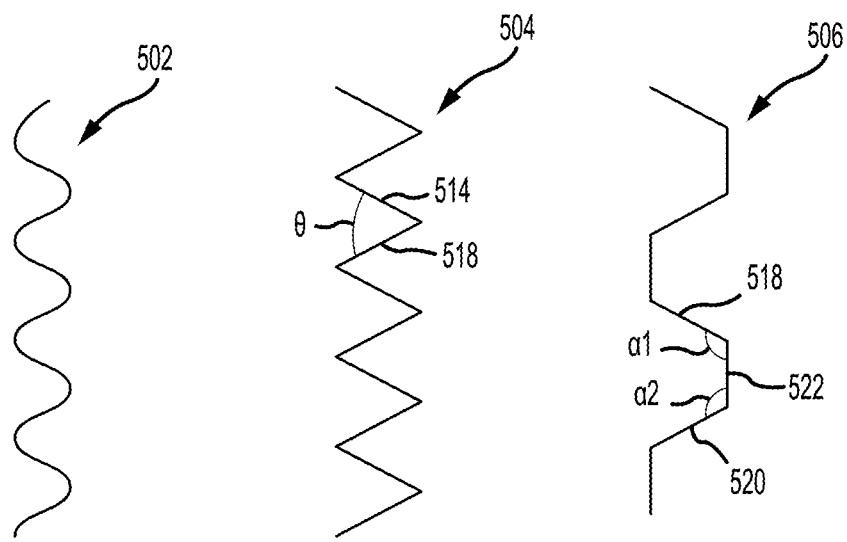
FIG. 5A illustrates a contour of a vesicle wall, in accordance with various embodiments.
FIG. 5B illustrates a contour of a vesicle wall, in accordance with various embodiments.
FIG. 5C illustrates a contour of a vesicle wall, in accordance with various embodiments.
Figures 5D, 5E, 5F:
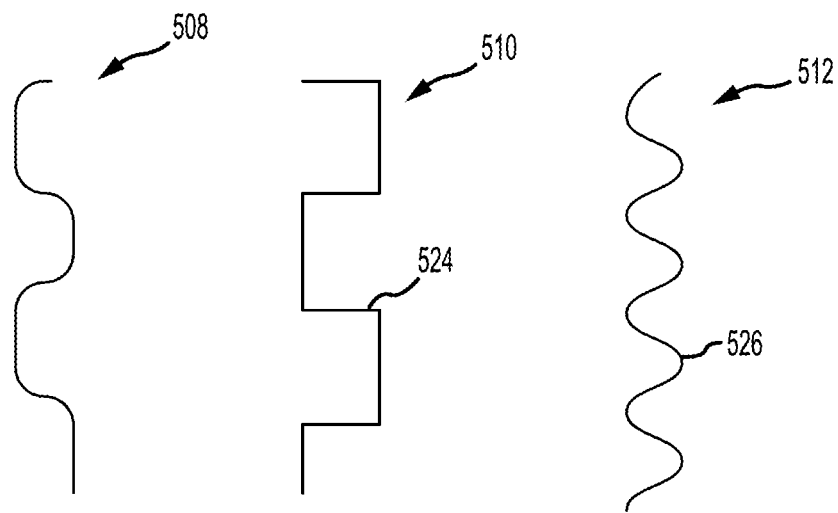
FIG. 5D illustrates a contour of a vesicle wall, in accordance with various embodiments.
FIG. 5E illustrates a contour of a vesicle wall, in accordance with various embodiments.
FIG. 5F illustrates a contour of a vesicle wall, in accordance with various embodiments.

With additional reference to FIGS. 5A, 5B, 5C, 5D, 5E, and 5F various alternative embodiments of a segment of a vesicle wall such as, for example, vesicle wall 216 are illustrated. FIG. 5A illustrates a sinusoidal vesicle wall 502 having a contour defined by a sine wave. FIG. 5b illustrates a triangular vesicle wall 504 having a contour defined a first leg 514, a second leg 516, and an angle θ therebetween. FIG. 5C illustrates a trapezoidal vesicle wall 506 having a contour defined by interior angles α1 and α2 between, respectively, first leg 518 and plateau 522 and between second leg 520 and plateau 522. FIG. 5D illustrates a sine-dwell vesicle wall 508 having a contour defined by a sine wave having a peak dwell waveform. FIG. 5E illustrates a rectangular vesicle wall 510 having a contour defined by rectilinear portions 524. FIG. 5F illustrates an elliptical vesicle wall 512 having a contour defined by elliptical portions 526. A vesicle wall may comprise any combination of contours illustrated in FIGS. 5A through 5F.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A monolithic pressure regulator, comprising:
   a body comprising a base wall, an end wall, and a side wall, the base wall spaced apart from the end wall in a longitudinal direction;
   a cavity within the body;
   an input port in fluid communication with the cavity;
   an output port in fluid communication with the cavity;
   a valve stem disposed within the cavity;
   a first vesicle and a second vesicle disposed between the end wall and the valve stem; and
   a third vesicle and a fourth vesicle disposed between the base wall and the valve stem, wherein the monolithic pressure regulator is configured to regulate a flow of fluid through the input port into the cavity at a source pressure to exit through the output port at a regulated pressure.

2. The monolithic pressure regulator of claim 1, wherein the first vesicle, the second vesicle, the third vesicle, and the fourth vesicle each comprises one of a sinusoidal vesicle wall, a triangular vesicle wall, a trapezoidal vesicle wall, a sine-dwell vesicle wall, a rectangular vesicle wall, or an elliptical vesicle wall.

3. The monolithic pressure regulator of claim 1, wherein the valve stem includes a head that is configured to seat against an inner surface of the base wall during operation of the monolithic pressure regulator.

4. The monolithic pressure regulator of claim 1, wherein the input port is disposed in the base wall, and wherein the output port is disposed in the end wall.

5. The monolithic pressure regulator of claim 4, further comprising a sense port in fluid communication with the third vesicle.

6. The monolithic pressure regulator of claim 5, wherein the sense port is disposed within the base wall.

7. The monolithic pressure regulator of claim 1, wherein the body, the valve stem, the first vesicle, the second vesicle, the third vesicle, and the fourth vesicle form a monolithic structure.

8. The monolithic pressure regulator of claim 1, wherein the end wall includes internal passages.

9. The monolithic pressure regulator of claim 8, wherein the internal passages fluidly couple an internal cavity of the first vesicle and the cavity.

* * * * *